United States Patent [19]

Heinrich et al.

[11] Patent Number: 4,750,098

[45] Date of Patent: Jun. 7, 1988

[54] UNRESTRICTED FREQUENCY CHANGER WITH CURRENT SOURCE OUTPUT

[75] Inventors: Theodore M. Heinrich; Andress Kernick; Peter Wood, all of Murrysville, Pa.

[73] Assignee: Westinghouse Electric Corp., Pittsburgh, Pa.

[21] Appl. No.: 92,964

[22] Filed: Sep. 2, 1987

[51] Int. Cl.[4] ............................................. H02M 5/22
[52] U.S. Cl. ....................................... 363/10; 363/160
[58] Field of Search ...................................... 363/9–11, 363/64, 159–164; 318/800, 807, 811

[56] References Cited

U.S. PATENT DOCUMENTS 3,431,483  3/1969  Lafuze .................................. 363/64
4,697,230  9/1987  Neft ..................................... 363/10

FOREIGN PATENT DOCUMENTS 2003234  11/1969  France .............................. 363/160

Primary Examiner—William H. Beha, Jr.
Attorney, Agent, or Firm—R. P. Lenart

[57] ABSTRACT

Three terminal, six and twelve pulse unrestricted frequency changing circuits are provided by inserting controllable bidirectional switching circuits between open star configured coils in multiple phase windings of isolation transformers. Where the switched winding are secondaries of the isolation transformer, interphase transformers are provided between each pair of three pulse circuit groups and additional interphase transformers are required between six pulse circuit groups to provide a three terminal output. Where the switched windings are primary windings of the isolation transformer, the secondary windings are electrically connected in series with each other to provide the three terminal output.

12 Claims, 7 Drawing Sheets

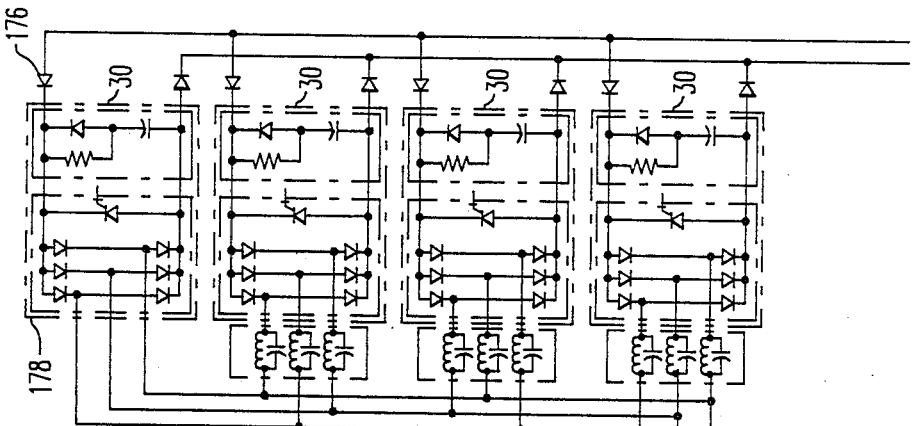
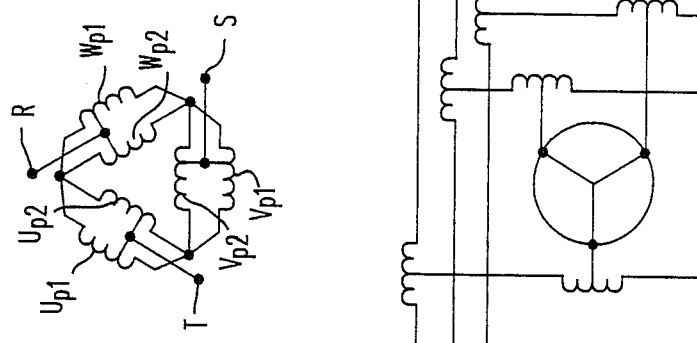
FIG. 3A
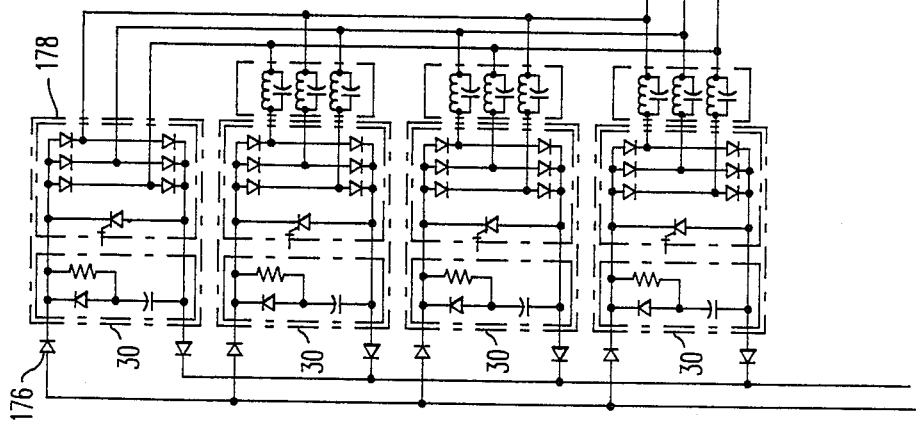

UNRESTRICTED FREQUENCY CHANGER WITH CURRENT SOURCE OUTPUT

BACKGROUND OF THE INVENTION

This invention relates to static power frequency changers in general, and more particular to unrestricted frequency changers (UFC) which are suitable for use in adjustable speed AC motor drives.

Unrestricted frequency changers are well known in the prior art. These circuits perform direct AC to AC power conversion by constructing a three phase set of desired AC voltage waveforms with chosen magnitude and frequency that can be either higher or lower than, or equal to that of the AC power source. Synthesis of the desired three phase output is made by the selection of segments of successive voltage waves of the AC source. A typical six pulse, pulse width modulated, force commutated UFC cycloconverter is illustraetd in FIG. 1 of U.S. Pat. No. 4,488,216 issued Dec. 11, 1984 to Gyugyi et al. Such circuits require AC switching elements which are capable of blocking voltage in either direction or conducting current in either direction.

The frequency spectrum of a UFC output waveform has been shown to be independent of the amplitude of the wanted fundamental component. Furthermore, the frequencies of unwanted (harmonic) components in the output waveform are widely separated from the fundamental frequency over the total output frequency range, being more widely separated as the output frequency is decreased. Bi-directionality of the AC switching elements gives bidirectional power flow capability to the UFC so that there is inherent ability to return motor overhauling energy back to the supply. Also, the UFC transforms the lagging power factor of an induction motor into a leading power factor load reflected to the AC source.

A six pulse UFC motor drive is usually configured around a six lead motor to obviate the need for a power transformer. However, power transformers may be required where: it is necessary to transform the output voltage; isolation in required for personnel safety or emergency operation with multiple ground faults; three terminal output is required; or a twelve pulse output is required for improved freuqency spectrum characteristics or higher power rating.

The 18 AC bidirectional switches of the circuit of FIG. 1 in U.S. Pat. No. 4,488,216 may be reduced to six if an isolation transformer is introduced and if each AC switch is configured in a three arrangement to open or close star points of secondary WYE windings of the isolation transformers in an appropriate switching sequence. Such circuits are referred to as being of the NETZTAKTUMRICHTER (NTU) type, and have been proposed by Von A. Brandt in "Der Netztaktumrichter," Bulletin des Schiveizerischen Elektrotechnischen Vereins, pp. 714–727, 62 (1971) 15, 25. Juli, Luzern. NTU circuits operate identically to unrestricted frequency changers in all respects except one. Individual phase voltage control can be accomplished by the UFC but the NTU can only control the three phase voltages in a balanced fashion.

SUMMARY OF THE INVENTION

This invention seeks to provide an improved NTU type unrestricted frequency changer having a three terminal output and providing isolation for certain applications wherein power system ground fault redundancy must be maintained for personnel safety and emergency operation with multiple ground faults.

This invention encompasses a six pulse, frequency changing circuit including an isolation transformer having a multiple phase primary winding and six multiple phase secondary windings. Each of the multiple phase secondary windings includes three coils wound in an open star configuration. A controllable, bidirectional switching circuit is electrically connected between the coils of each of the multiphase secondary windings, and the secondary windings and associated switching circuits are divided into a pair of three pulse circuit groups. Two sets of intermediate terminals are provided with three intermediate terminals in each set. Each of the coils of the multiple phase secondary windings is connected to one of the intermediate terminals and interphase transformers are connected between corresponding terminals in the intermediate terminal sets. Each of the interphase transformers includes a tap conductor which is connected to one of three output terminals.

Two of the six pulse unrestricted frequency changing circuits can be connected together through an additional set of interphase transformers to provide a twelve pulse frequency changing circuit.

This invention also encompasses a six pulse frequency changing circuit including two isolation transformers, each having three multiple phase primary windings and a multiple phase secondary winding. The primary windings each include three coils wound in an open star configuration; controllable, bidirectional switching circuits are electrically connected between the coils of each of the primary windings; and, the switching circuits and primary windings are configured into two three pulse circuit groups. Each of the coils in the multiple phase primary windings is electrically connected to one of three input terminals. Corresponding coils of the isolation transformer secondary windings are electrically connected in series with each other to form three circuit branches which are electrically connected to three output terminals. A twelve pulse version of the circuit is provided by using four isolation transformers to feed four three pulse circuit groups and by including a 30° phase displacement between the input voltage supplied to first and second pairs of the isolation transformers.

BRIEF DESCRIPTION OF THE DRAWINGS

FIGS. 3A and 3B are schematic diagrams of an alternative embodiment of the present invention.

DESCRIPTION OF THE PREFERRED EMBODIMENTS

Figure 1:
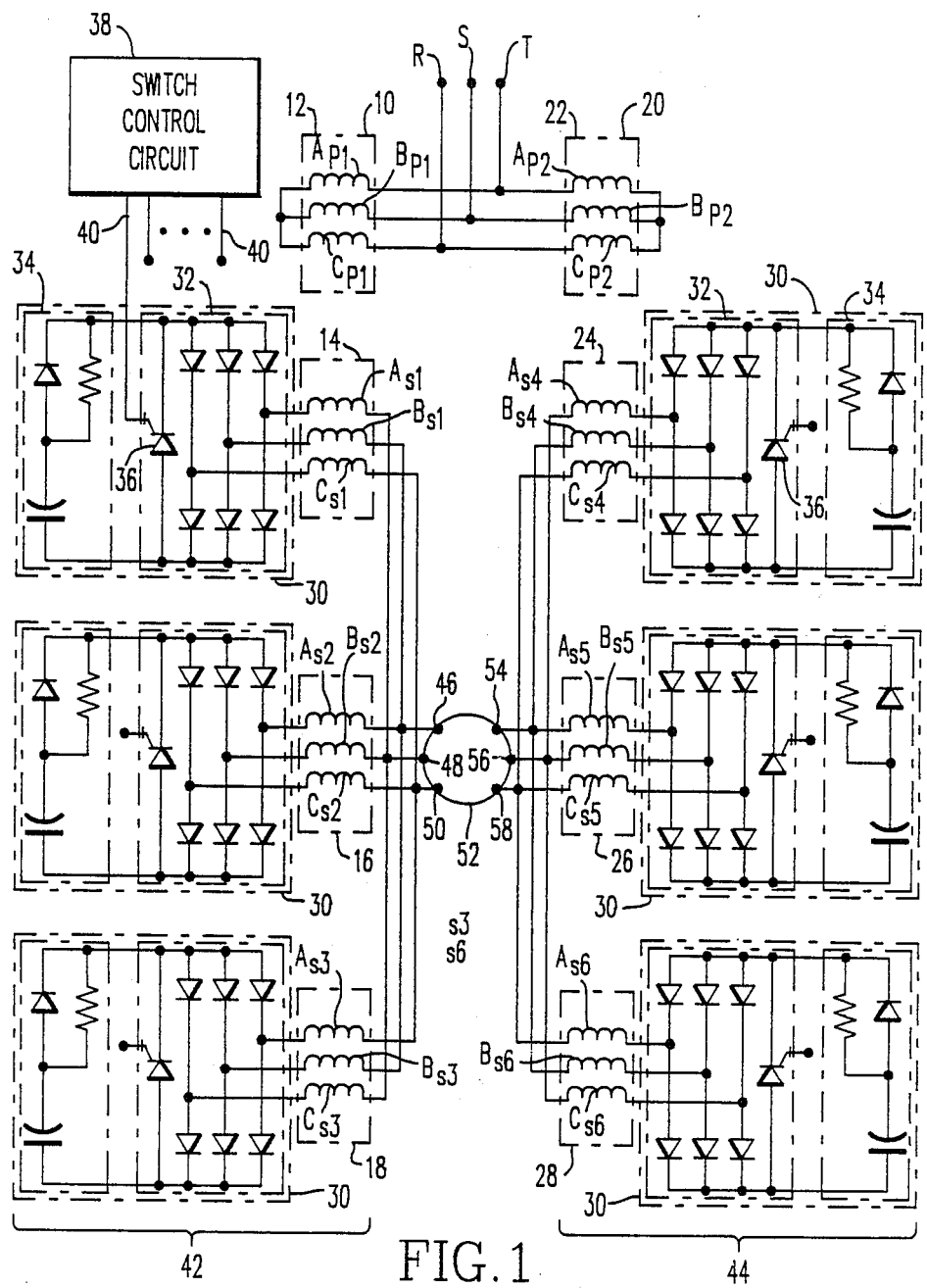
FIG. 1 is a schematic diagram of a prior art NTU type of unrestricted frequency changer.

Referring to the drawings, FIG. 1 is a schematic diagram of a prior art NTU frequency changing circuit. That circuit includes three terminals R, S and T for receiving three phase power from an external AC source. A first isolation transformer 10 includes a multiple phase primary winding 12 including coils $A_{p1}$, $B_{p1}$, and $C_{p1}$, and three multiple phase secondary windings 14, 16 and 18. Each of the multiple phase secondary windings includes three coils wound in an open star configuration. In particular, secondary winding 14 includes coils $A_{s1}$, $B_{s1}$, and $C_{s1}$; secondary winding 16 includes coils $A_{s2}$, $B_{s2}$, and $C_{s2}$; and secondary winding 18 includes coils $A_{s3}$, $B_{s3}$, and $C_{s3}$. A second isolation transformer 20 includes a multiple phase primary winding 22 having coils $A_{p2}$, $B_{p2}$, and $C_{p2}$. Transformer 20 also includes multiple phase secondary windings 24, 26 and 28, with secondary winding 24 including coils $A_{s4}$, $B_{s4}$, and $C_{s4}$; secondary winding 26 including coils $A_{s5}$, and $B_{s5}$, and $C_{s5}$; and secondary winding 28 including coils $A_{s6}$, $B_{s6}$, and $C_{s6}$.

A plurality of switching circuits 30 are connected between individual coils in each of the secondary windings and serve to electrically connect or disconnect the coils in the associated secondary winding. Each of these switching circuits includes a controllable, bidirectional switch 32 and a snubber circuit 34 connected across the switch. The actual switching element in each controllable switch is a gate turnoff thyristor 36 which is controlled by a switch control circuit 38. This switch control circuit 38 is connected by way of a plurality of output lines 40 to each of the gate turnoff thyristors in the switching circuits. To simplify the drawing, only one of these connections is illustrated.

The secondary windings of the isolation transformer and a switching circuit associated with each of these windings are divided into two three pulse circuit groups 42 and 44. Three pulse group 42 supplies a three pulse output to terminals 46, 48 and 50 of motor 52 while three pulse group 44 supplies an output to terminals 54, 56 and 58 of motor 52. The switch control circuit 38 alternately turns gate turnoff thyristors 36 on and off in accordance with known prior art switching techniques to achieve the desired output frequency and voltage characteristics.

Figure 2A:
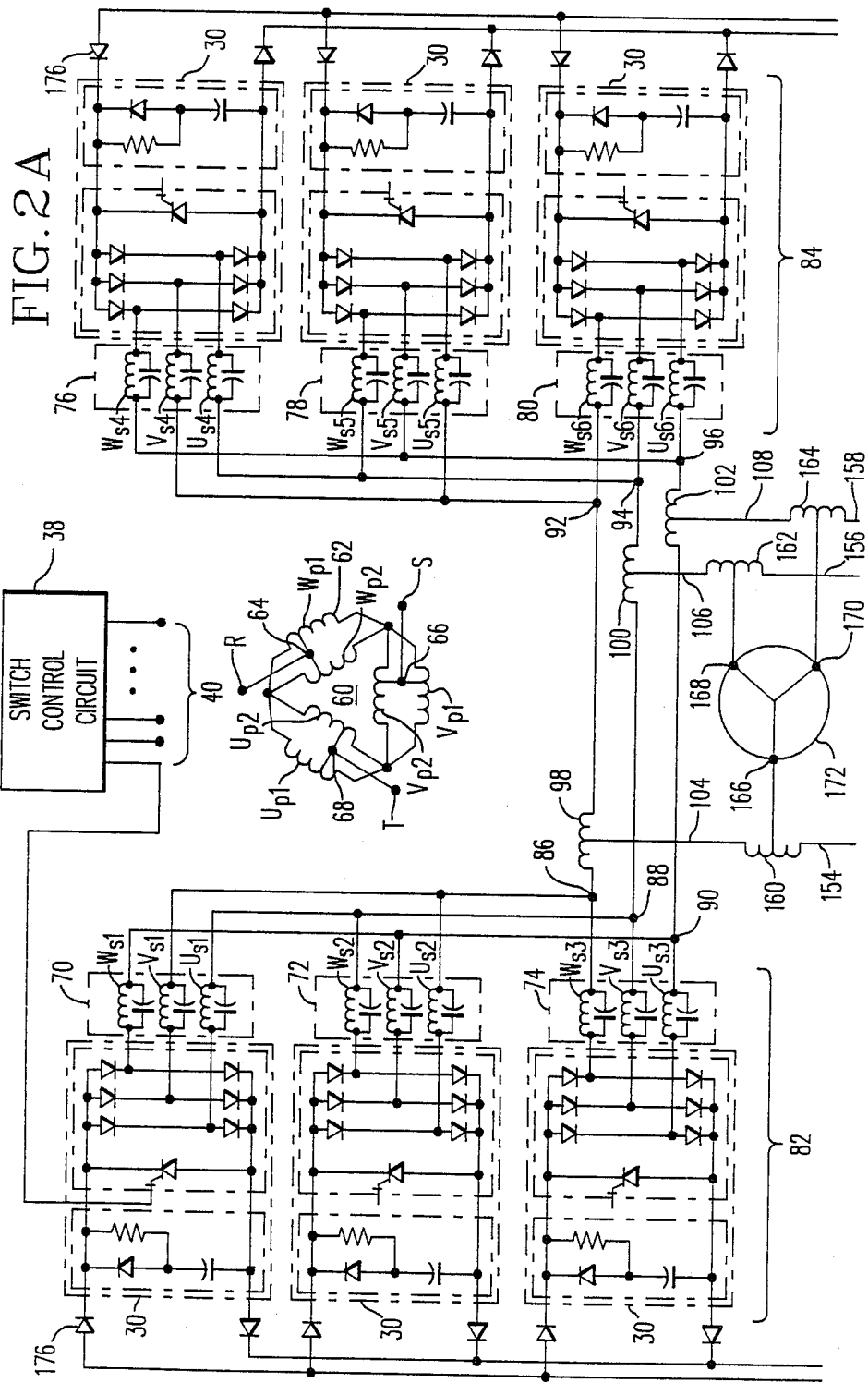
FIGS. 2A and 2B are schematic diagrams of a twelve pulse NTU type unrestricted frequency changer constructed in accordance with one embodiment of the present invention.
Figure 2B:
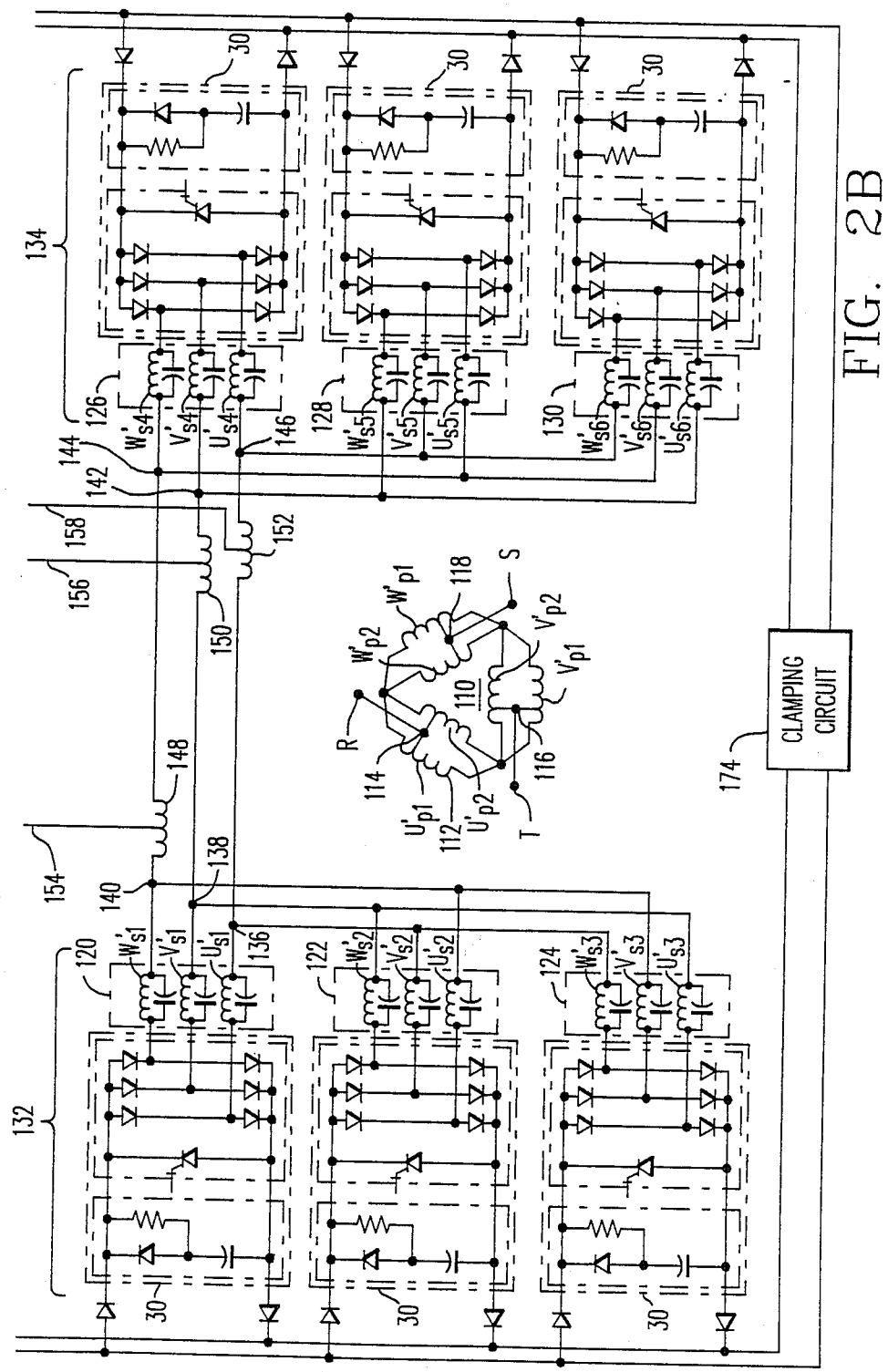

FIGS. 2A and 2B show a schematic diagram of an NUT type unrestricted frequency changer constructed in accordance with one embodiment of the present invention. Input terminals are R, S and T are used to provide three phase Ac power from an external AC source to a first isolation transformer 60 having a multiple phase primary winding 62 which comprises a plurality of coils $U_{p1}$, $U_{p2}$, $V_{p1}$, $V_{p2}$, $W_{p1}$, and $W_{p2}$. These coils are connected in a delta configuration with each leg of the delta having two parallel connected coils. The input terminals are connected to taps 64, 66 and 68 on the primary winding coils to provide a phase displacement of the secondary voltage. Isolation transformer 60 includes 6 multiple phase secondary windings 70, 72, 74, 76, 78 and 80. Each of the multiple phase secondary windings include three coils wound in an open star configuration. In particular, secondary winding 70 includes coils $W_{s1}$, $V_{s1}$, and $U_{s1}$; secondary winding 72 includes coils $W_{s2}$, $V_{s2}$, and $U_{s2}$; secondary winding 74 includes coils $W_{s3}$, $V_{s3}$, and $U_{s3}$; secondary winding 76 includes coils $W_{s4}$, $V_{s4}$, and $U_{s4}$; secondary winding 78 includes coils $W_{s5}$, $V_{s5}$, and $U_{s5}$; and secondary winding 80 includes coils $W_{s6}$, $V_{s6}$, and $U_{s6}$. A controllable bidirectional switching circuit 30 is connected between the coils of each of the secondary windings, and the secondary windings and associated controllable switching circuits are configured into a first pair of three pulse circuit groups 82 and 84. Each of the coils in the multiple phase secondary windings of three pulse circuit group 82 is connected to one of a first set of three intermediate terminals 86, 88 and 90. Similarly, each of the coils of the secondary windings in three pulse circuit group 84 is connected to one of a second set of three intermediate terminals 92, 94 and 96. Interphase transformers 98, 100, and 102 are connected between corresponding ones of the intermediate terminals in the first and second set of intermediate terminals. Conductors 104, 106 and 108 are connected to center taps on the interphase transformers so that equal reactances are provided on opposite sides on each of the center taps.

A second isolation transformer 110 includes a multiples phase primary winding 112 having coils $U'_{p1}$, $U'_{p2}$, $V'_{p}$, $V'_{p2}$, $W'_{p1}$, and $W'_{p2}$ connected in a delta arrangement with each leg of the delta having two coils connected in parallel. Tap points 114, 116 and 118 are provided so that the secondary voltages of transformer 110 are phased displaced. The total phase displacement between the secondary voltages of the isolation transformers 60 and 110 is 30 electrical degrees.

The second isolation transformer 110 also includes 6 multiples phase secondary windings 120, 122, 124, 126, 128 and 130. Each of the secondary windings includes three coils connected in an open star configuration with secondary winding 120 including coils $W'_{s1}$, $V'_{s1}$, and $U'_{s1}$; secondary winding 122 including coils $W'_{s2}$, and $V'_{s2}$, $U'_{s2}$; secondary winding 124 including coils $W'_{s3}$, $V'_{s3}$, and $U'_{s3}$; secondary winding 126 including coils $W'_{s4}$, $V'_{s4}$, and $U'_{s4}$; secondary winding 128 including coils $W'_{s5}$, $V'_{s5}$, and $W'_{s5}$; and secondary winding 130 including coils $W'_{s6}$, $V'_{s6}$, and $U'_{s6}$. Once again, a controllable, bidirectional switching circuit 30 is provided between the coils of each multiple phase secondary winding. Secondary windings 120, 122 and 124, and their associated switching circuits 30, include a third three pulse group 132 while secondary windings 126, 128 and 130, along with their associated switching circuits 30, form a fourth three pulse circuit group 134. Three pulse group 132 provides an output voltage to a third set of intermediate terminals 136, 138 and 140 while three pulse group 134 provides an output voltage to a fourth set of intermediate terminals 142, 144 and 146. A second set of interphase transformers 148, 150 and 152 are connected between corresponding intermediate terminals in the third and fourth sets of intermediate terminals such that a six pulse output appears on conductors 154, 156 and 158 which extend from center taps on the transformers in the second sets of interphase transformers.

A third set of interphase transformers 160, 162 and 164 are connected between corresponding center tap points on interphase transformers in the first and second set to provide a twelve pulse output to three output terminals 166, 168 and 170 on motor 172.

Each of the four three pulse groups in FIG. 2 produces an in-phase fundamental output. Leakage reactances and interphase transformers support harmonic and unwanted voltage components. The first and second sets of interphase transformers support three pulse unwanted components while the third set of interphase transformers supports six pulse unwanted components.

Output voltage magnitude control is accomplished by pulse duration modulation in accordance with known techniques, such as the control technique illustrated in U.S. Pat. No. 4,488,216.

The tapped delta primary windings on the isolation transformers provide two 15° phase shifts for a total phase displacement of 30° as required between the two six pulse groups. It should be understood that a three terminal, six pulse NTU type of unrestricted frequency changer can be constructed by using the upper half of FIG. 2 which includes three pulse groups 82 and 84 and interphase transformers 98, 100 and 102. The six pulse output appears on conductors 104, 106 and 108.

A single voltage limiting clamping circuit 174 is connected to each of the controllable switching circuits through a plurality of diodes 176. This is possible since at turn off, the WYE neutrals of the secondary windings are at a common low potential.

Since the isolation transformers 60 and 110 operate at source frequency, the circuit of FIG. 2 can produce variable frequency output down to zero frequency while voltage control is independent of frequency. Although two parallel connected coils are shown in each leg of the delta primaries of isolation transformers 60 and 110, a single primary coil in each leg could also be used.

Figure 3B:
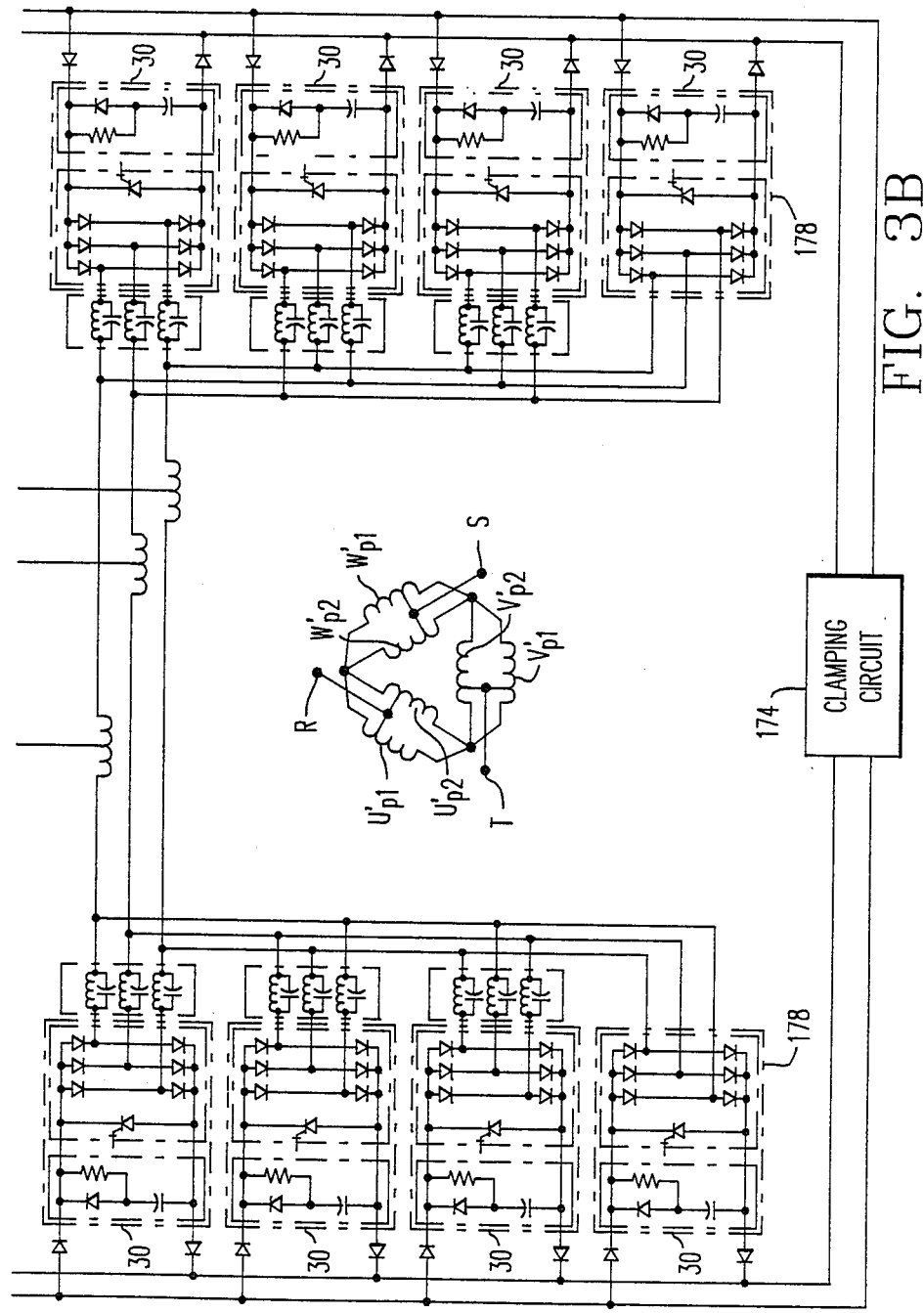

FIGS. 3A and 3B show a schematic of an alternative embodiment of the present invention which has a means of producing a zero output voltage in each three pulse group. This function is accomplished by adding four additional controllable bidirectional AC switching circuits 178 to the circuit of FIGS. 2A and 2B. Each of these additional switching circuits is connected between the intermediate terminals of one of the sets of intermediate terminals, to provide true zero by shorting the intermediate terminals of each set together. This results in a true zero voltage output, and not a time average cancellation of voltage as in FIGS. 2A and 2B. Interphase transformers for both three pulse and six pulse unwanted voltage components are essential. Since the worst case three pulse unwanted components occur well below unity output voltage ratio, the true zero, three pulse, pulse duration modulation from the additional switching circuits allows significant size reduction of the first and second set of interphase transformers. Also, the overcurrent fault carrying capacity of the gate turnoff thyristors, if used, can exceed turnoff current capability. Therefore, since the switching sequence is frozen upon turn on of the four additional switching circuits in this twelve pulse configuration the system can carry substantial follow through fault currents. Once again, a six pulse, three terminal output circuit can be provided by using one half (two three pulse groups) of the circuit of FIG. 3.

Figure 4A:
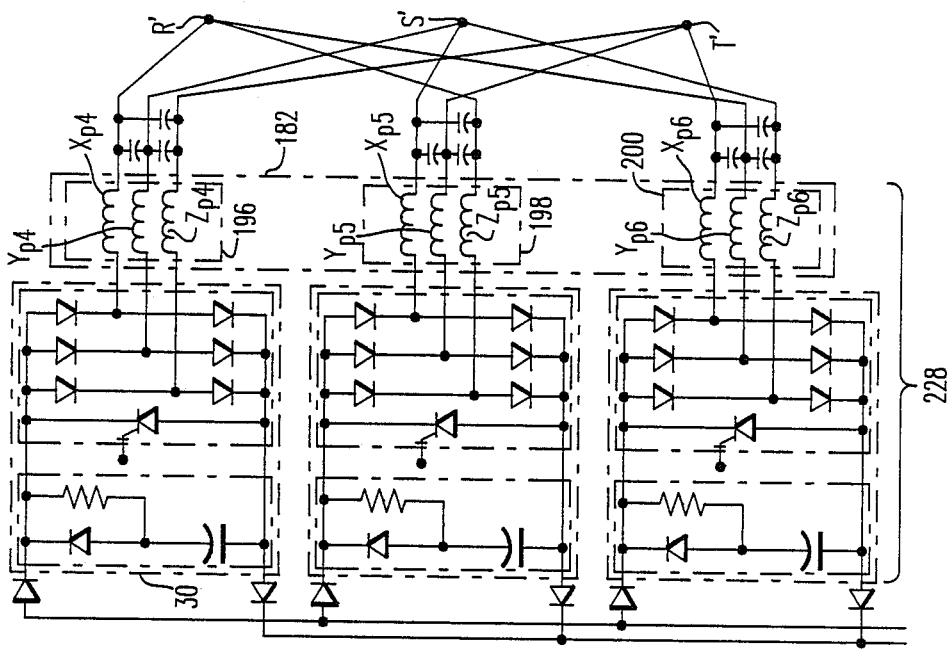
FIGS. 4A and 4B are schematic diagrams of another alternative embodiment of the present invention.
Figure 4A:
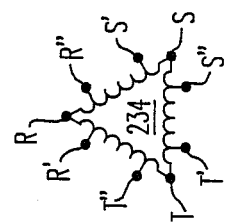
Figure 4A:
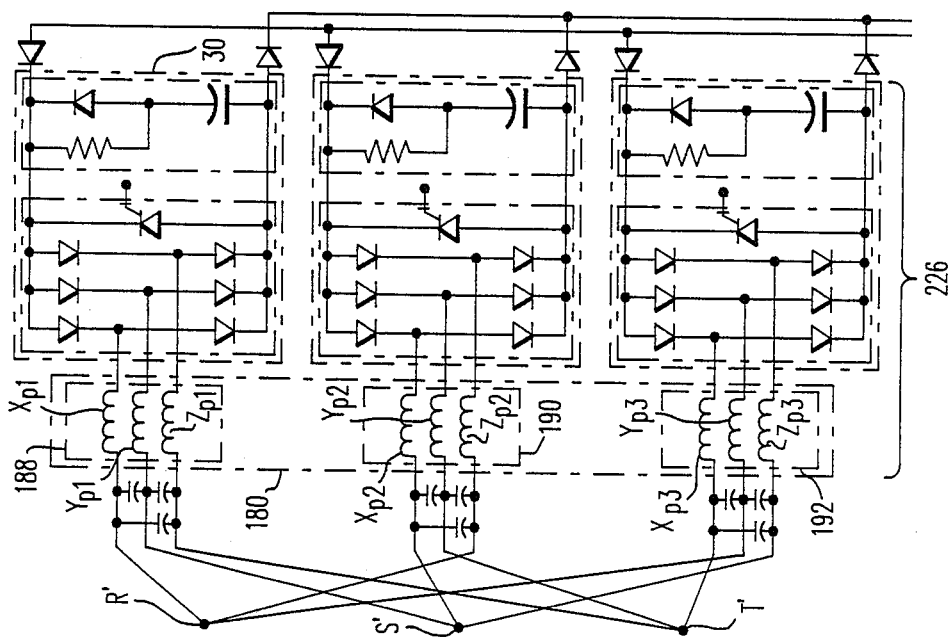
Figure 4B:
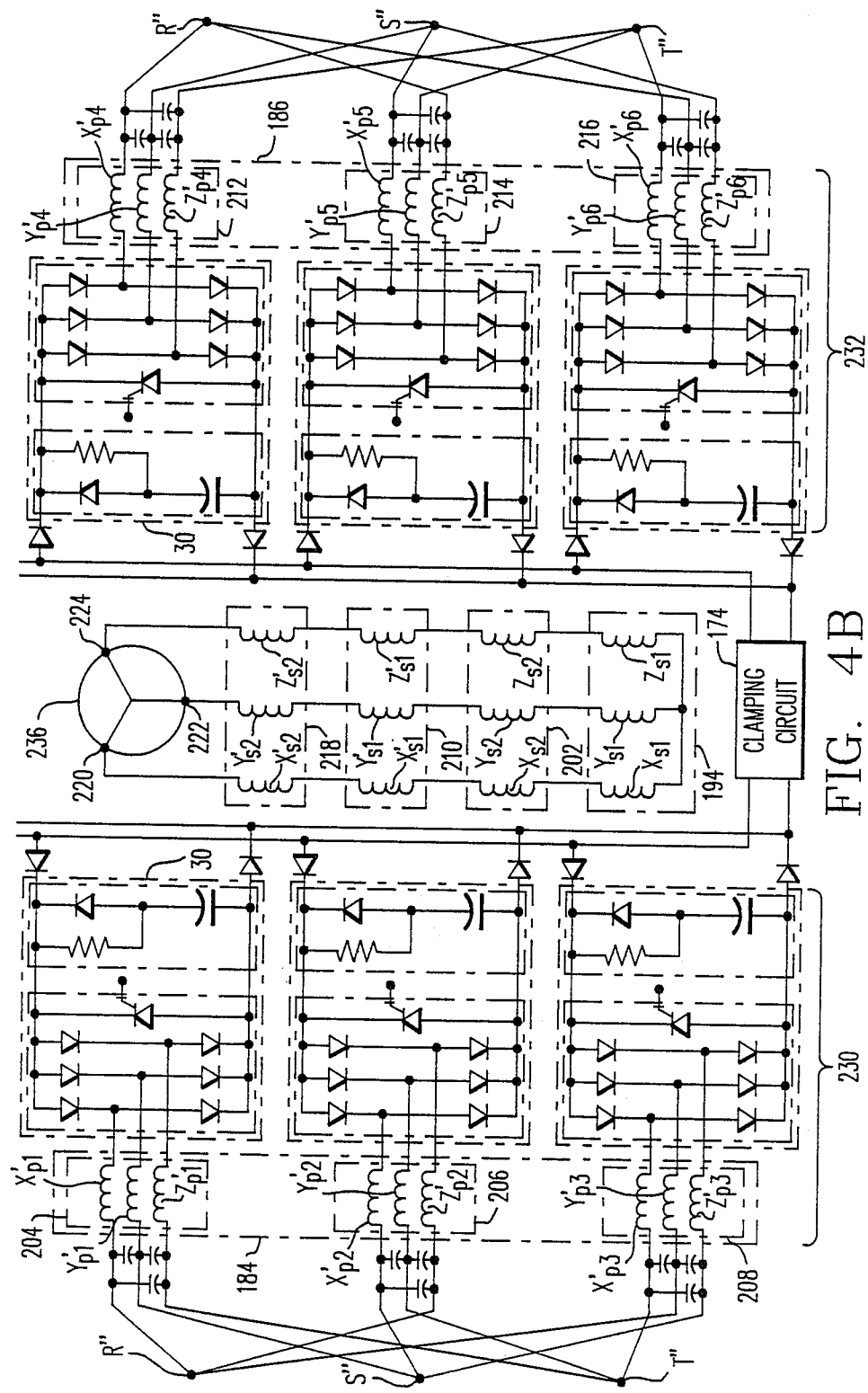

Another alternative embodiment of a twelve pulse NTU type UFC having a three terminal output is illustrated in the schematic diagram of FIGS. 4A and 4B. This circuit includes four isolation transformers 180, 182, 184 and 186 each having multiple phase windings and a multiple phase secondary winding. Isolation transformer 180 includes multiple phase primary windings 188, 190 and 192 and a multiple phase secondary winding 194. Each of the primary windings includes three coils connected in an open star configuration. In particular, primary winding 188 includes coils $X_{p1}$, $Y_{p1}$, and $Z_{p1}$; primary winding 190 includes coils $X_{p2}$, $Y_{p2}$, and $Z_{p2}$; and primary winding 192 includes coils $X_{p3}$, $Y_{p3}$, and $Z_{p3}$. Secondary winding 194 includes coils $X_{s1}$, $Y_{s1}$ and $Z_{s1}$. Isolation transformer 182 includes primary windings 196, 198 and 200 and secondary winding 202. Primary winding 196 includes coils $X_{p4}$, $Y_{p4}$, and $Z_{p4}$; primary winding 198 includes coils $X_{p5}$, $Y_{p5}$, $Z_{p5}$; and primary winding 200 includes coils $X_{p6}$, $Y_{p6}$, and $Z_{p6}$. Secondary winding 202 includes coils $X_{s2}$, $Y_{s2}$, and $Z_{s2}$. Isolation transformer 184 includes multiple phase primary windings 204, 206 and 208 and secondary winding 210 while isolation transformers 186 includes primary windings 212, 214 and 216 and secondary winding 218. In this circuit, corresponding phase coils of the secondary windings of the isolation transformers are electrically connected in series with each other to form three circuit branches which are connected to output terminals 220, 222 and 224. The isolation transformer primary windings and associated controllable switching circuits are arranged into four three pulse circuit groups 226, 228, 230 and 232. A first pair of these three pulse circuit groups 226 and 228 receives input voltage on terminals R', S' and T'. The other pair of three pulse circuit groups 230 and 232 receives input voltage on terminals R'', S'' and T''. A phase displacement and stepdown auto transformer 234 receives input voltage from an external AC source at the terminals R, S, and T and includes two sets of voltage taps spaced 30 electrical degrees apart. The first set of taps is connected to terminals R', S' and T', while the second set of taps is connected to terminals R'', S'' and T''.

Since the isolation transformers in the circuit of FIGS. 4A and 4B operate at output frequency instead of source frequency, transformer leakage reactance becomes lumped with the motor 236 as an output current source and does not appear in the commutating loops. The circuit of FIG. 4 has additional advantages over the circuits of FIGS. 2A, 2B, 3A and 3B in that output voltage transformation is obtained without impacting switching device voltage requirements, and three pulse and six pulse unwanted voltage components are cancelled in the series connection of output transformer windings without resorting to any interphase transformers. Furthermore, true zero pulse duration modulation is achieved in each of the six pulse circuit groups without requiring additional AC switches and a true zero overcurrent trip can accommodate a failed switching circuit that is permanently shorted. Therefore, the control logic, after detecting a non-interruption response from a shorted AC switching circuit, can select the appropriate complementary switch to turn on for sustained true zero output.

The present invention provides an NTU type UFC circuit having a three terminal output which is particularly applicable to motor drive systems requiring a variable frequency output at constant voltage-to-frequency ratio where the output voltage needed is incompatible with switching device capabilities. Full rated power transformers are used for isolation from the main power and/or for large step-up or stepdown transformation ratios.

Although the present invention has been described in terms of what are at present believed to be its preferred embodiments, it will be apparent to those skilled in the art that various changes may be made without departing from the scope of the invention. It is therefore intended that the appended claims cover such changes.

What is claimed is:
1. A frequency changing circuit comprising:
 first and second isolation transformers each having a multiple phase primary winding and six multiple phase secondary windings;
 means for providing a phase displacement between voltages on corresponding ones of the secondary windings of said first and second isolation transformers;
 each of said multiple phase secondary windings including three coils wound in an open star configuration;

first and second pairs of three pulse circuit groups;
each of said three pulse circuit groups including three of said multiple phase secondary windings of one of said isolation transformers and three controllable, bidirectional switching circuits, each being electrically connected between the coils of one of said secondary windings;
a first pair of intermediate terminal sets, each comprising three intermediate terminals;
each of said coils in said multiple phase secondary windings in said first pair of three pulse circuit groups being electrically connected to one of said intermediate terminals of said first pair of intermediate terminal sets;
a first set of three interphase transformers;
each of said interphase transformers in said first set of interphase transformers including a tap conductor and being electrically connected between corresponding intermediate terminals in said first pair of intermediate terminals sets;
a second pair of intermediate terminals sets, each comprising three intermediate terminals;
each of said coils in said multiple phase secondary windings in said second pair of three pulse circuit groups being electrically connected to one of said intermediate terminals of said second pair of intermediate terminal sets;
a second set of three interphase transformers;
each of said interphase transformers in said second set of interphase transformers including a tap conductor and being electrically connected between corresponding intermediate terminals in said second pair of intermediate terminal sets;
a third set of three interphase trannformers;
each of said interphase transformers in said third set of interphase transformers including a tap conductor and being electrically connected between corresponding tap conductors of said first and second sets of interphase transformers;
three output terminals; and
each of said output terminals being electrically connected to one of the tap conductors of said interphase transformers in said third set of interphase transformers.

2. A frequency changing circuit as recited in claim 1, wherein:
each of said isolation transformers includes a delta connected three phase primary winding; and
said means for producing a phase displacement includes input taps connected to intermediate points on individual coils in said primary winding.

3. A frequency changing circuit as recited in claim 1, further comprising:
a clamping circuit electrically connected across each of said switching circuits.

4. A frequency changing circuit as recited in claim 1, further comprising:
a plurality of additional controllable, bidirectional switching circuits, each of said additional switching circuits being connected between the intermediate terminals of one of said sets of intermediate terminals.

5. A frequency changing circuit comprising:
an isolation transformer having a multiple phase primary winding and six multiple phase secondary windings;
each of said multiple phase secondary windings including three coils wound in an open star configuration;
first and second three pulse circuit groups;
each of said three pulse circuit groups including three of said multiple phase secondary windings of said isolation transformer and three controllable, bidirectional switching circuits, each being electrically connected between the coils of one of said secondary windings;
first and second intermediate terminal sets, each comprising three intermediate terminals;
each of said coils in said multiple phase secondary windings in said first three pulse circuit group being electrically connected to one of said intermediate terminals of said first intermediate terminal set;
each of said coils in said multiple phase secondary windings in said second three pulse circuit group being electrically connected to one of said intermediate terminals of said second intermediate terminal set;
three interphase transformers;
each of said interphase transformers including a tap conductor and being electrically connected between corresponding intermediate terminals in said first and second intermediate terminal sets;
three output terminals; and
each of said output terminals being electrically connected to one of the tap conductors of said interphase transformers.

6. A frequency changing circuit as recited in claim 5, further comprising:
a clamping circuit electrically connected across each of said switching circuits.

7. A frequency changing circuit as recited in claim 5, further comprising:
a plurality of additional controllable, bidirectional switching circuits, each of said additional switching circuits being connected between the intermediate terminals of one of said sets of intermediate terminals.

8. A frequency changing circuit comprising:
four isolation transformers each having three multiple phase primary windings and a multiple phase secondary winding;
each of said multiple phase primary windings including three coils wound in an open star configuration;
first and second pairs of three pulse circuit groups;
each of said three pulse circuit groups including three of said multiple phase primary windings of one of said isolation transformers and three controllable, bidirectional switching circuits, each being electrically connected between the coils of one of said primary windings;
two input terminal sts, each comprising three input terminals;
means for providing a phase displacement between input voltages on said two input terminals sets;
each of said coils in said multiple phase primary windings in said first pair of three pulse circuit grups being electrically connected to one of said input terminals of a first one of said input terminals sets;
each of said coils in said multiple phase primary windings in said second pair of three pulse circuit groups being electrically connected to one of said input terminals of a second one of said input terminal sets;

three output terminals; and each of said isolation transformer secondary windings including three phase coils, wherein corresponding ones of said phase coils are electrically connected in series with each other to form three circuit branches which are electrically connected to said three output terminals.

9. A frequency changing circuit as recited in claim 8, wherein:

said means for providing a phase displacement between the input voltages of said isolation transformers includes a third transformer having two sets of taps spaced thirty electrical degrees apart.

10. A frequency changing circuit as recited in claim 8, further comprising:

a clamping circuit electrically connected across each of said switching circuits.

11. A frequency changing circuit comprising:

two isolation transformers each having three multiple phase primary windings and a multiple phase secondary winding;

each of said multiple phase primary windings including three coils wound in an open star configuration;

first and second three pulse circuit groups;

each of said three pulse circuit groups including three of said multiple phase primary windings of one of said isolation transformers and three controllable, bidirectional switching circuits, each being electrically connected between the coils of one of said primary windings;

three input terminals;

each of said coils in said multiple phase primary windings in said first three pulse circuit groups being electrically connected to one of said input terminals;

each of said coils in said multiple phase primary windings in said second three pulse circuit groups being electrically connected to one of said input terminals;

three output terminals and;

each of said isolation transformer secondary windings including three phase coils, wherein corresponding ones of said phase coils are electrically connected in series with each other to form three circuit branches which are electrically connected to said three output terminals.

12. A frequency changing circuit as recited in claim 11, further comprising:

a clamping circuit electrically connected across each of said switching circuits.

* * * * *